United States Patent
Plattner

(10) Patent No.: US 6,658,881 B1
(45) Date of Patent: Dec. 9, 2003

(54) APPARATUS AND METHOD FOR MOUNTING A CONDENSER IN AN AIRCRAFT

(76) Inventor: Wesley M. Plattner, 1146 Breyman Highway, Tipton, MI (US) 48287

( * ) Notice: Subject to any disclaimer, the term of this patent is extended or adjusted under 35 U.S.C. 154(b) by 0 days.

(21) Appl. No.: 09/992,975

(22) Filed: Nov. 19, 2001

Related U.S. Application Data

(60) Provisional application No. 60/249,798, filed on Nov. 17, 2000, and provisional application No. 60/336,526, filed on Oct. 23, 2001.

(51) Int. Cl.⁷ .................................................. B60H 1/32
(52) U.S. Cl. .......................................... 62/239; 62/244
(58) Field of Search ...................... 244/118.5; 62/507, 62/239

(56) References Cited

U.S. PATENT DOCUMENTS

| | | | | |
|---|---|---|---|---|
| 2,694,537 A | * | 11/1954 | Reichert ................... | 244/118.5 |
| 2,941,372 A | * | 6/1960 | Tailor ........................... | 62/7 |
| 2,963,879 A | * | 12/1960 | Paravicini .................... | 62/239 |
| 3,148,514 A | * | 9/1964 | Mathis ......................... | 62/183 |
| 3,324,675 A | * | 6/1967 | Mills ............................ | 62/239 |
| 3,583,658 A | * | 6/1971 | Herweg .................... | 244/118.5 |
| 3,643,439 A | * | 2/1972 | Petersen ...................... | 244/15 |
| 3,711,044 A | * | 1/1973 | Matulich .................. | 244/118.5 |
| 3,804,353 A | * | 4/1974 | Scott et al. ............... | 123/41.43 |
| 4,399,665 A | * | 8/1983 | Evans et al. .............. | 244/118.5 |
| 4,490,989 A | * | 1/1985 | Keen ............................ | 165/41 |
| 4,763,859 A | * | 8/1988 | Biagini .................... | 244/118.5 |
| 4,869,071 A | * | 9/1989 | Wehner et al. ............. | 62/133 |
| 5,145,124 A | * | 9/1992 | Brunskill et al. ......... | 244/118.5 |
| 5,369,960 A | * | 12/1994 | Mueller et al. ............. | 165/168 |
| 5,386,952 A | * | 2/1995 | Nordstrom et al. ...... | 244/118.1 |
| 5,513,500 A | * | 5/1996 | Fischer et al. ............. | 62/239 |
| 5,667,168 A | * | 9/1997 | Fluegel .................... | 244/117 A |
| 5,899,085 A | * | 5/1999 | Williams .................... | 62/236 |

FOREIGN PATENT DOCUMENTS

| | | | | |
|---|---|---|---|---|
| DE | 3824471 A1 | * | 2/1990 | .......... B64D/11/00 |
| GB | 2150278 A | * | 6/1985 | .......... B64D/13/08 |
| GB | 2166542 A | * | 5/1986 | .......... B64D/13/00 |
| GB | 2208702 A | * | 4/1989 | .......... B64D/13/08 |

\* cited by examiner

*Primary Examiner*—William E. Tapolcai
*Assistant Examiner*—Mohammad M. Ali
(74) *Attorney, Agent, or Firm*—Young & Basile, P.C.

(57) ABSTRACT

A method and apparatus for mounting a condenser of a cooling system of an aircraft to permit overboard evacuation of residual heat created by the cooling system of the aircraft. The present invention provides an enclosure mounted to the aircraft wherein the enclosure provides an air inlet and an air outlet. The condenser of the cooling system is mounted within the enclosure in communication with the air inlet and air outlet of the enclosures. At least one powered impeller is mounted within the enclosure for directing air through the air inlet, across the condenser, and out the air outlet of the enclosure.

21 Claims, 9 Drawing Sheets

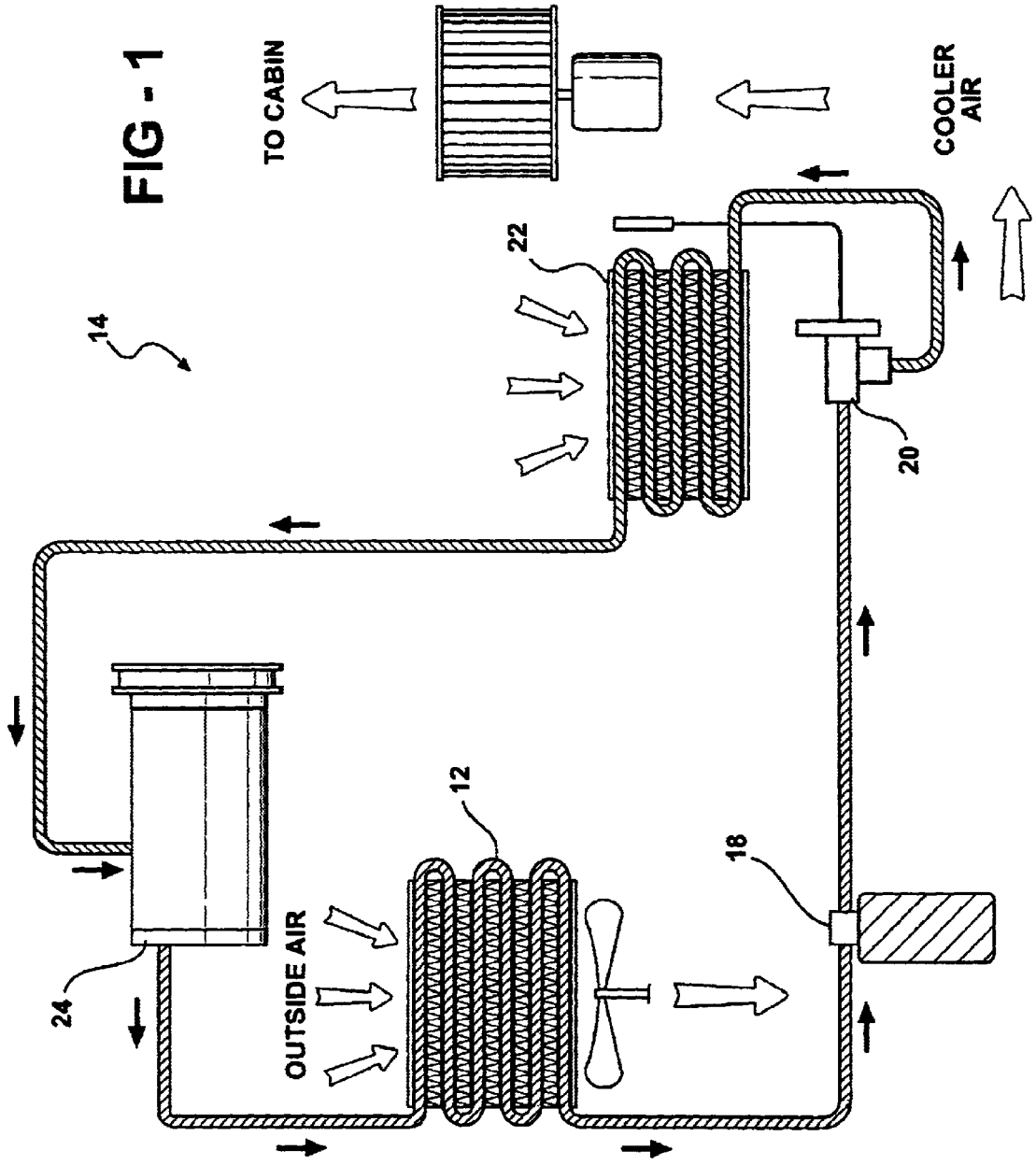

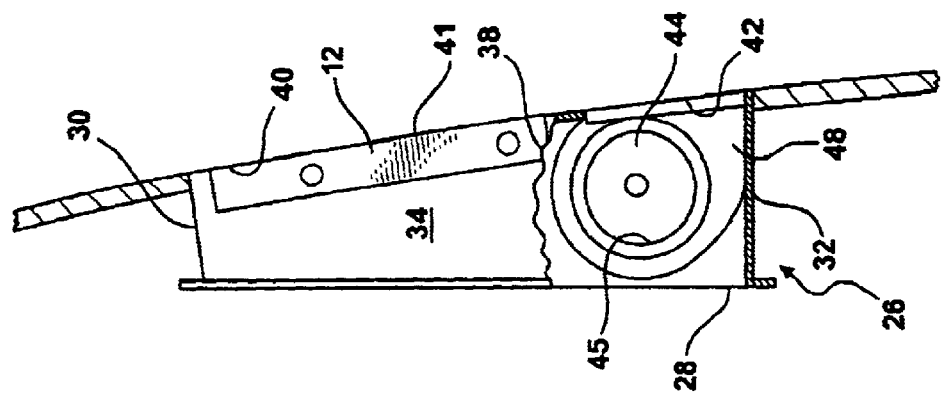
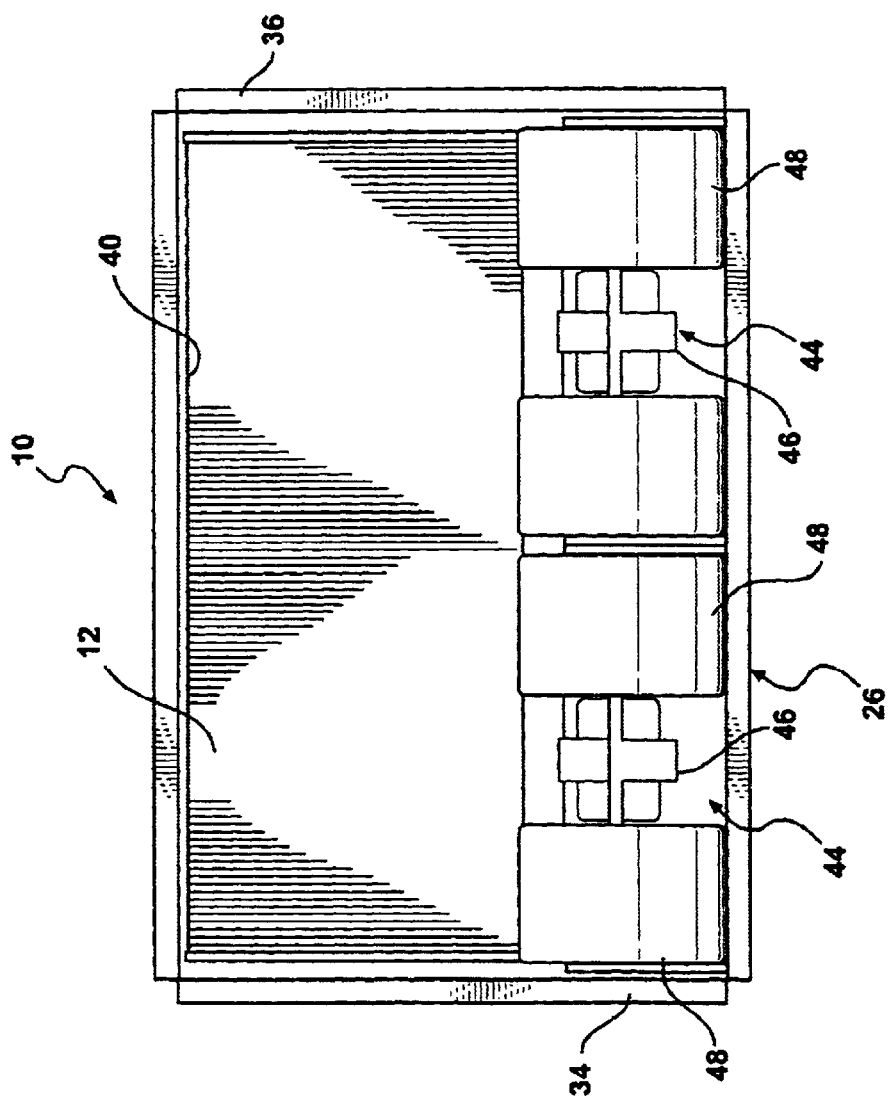
FIG - 2B
FIG - 2A

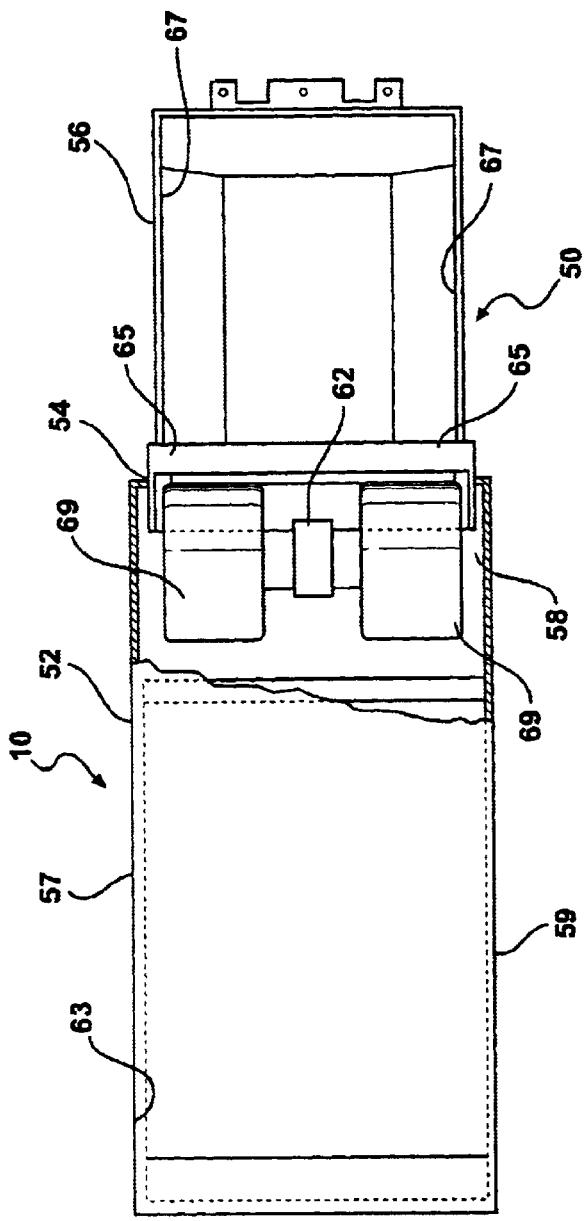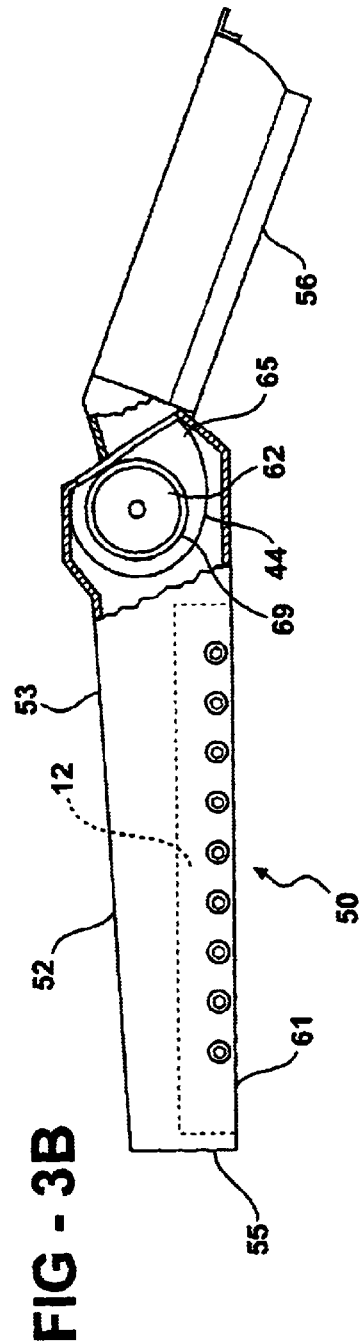
FIG - 3A
FIG - 3B

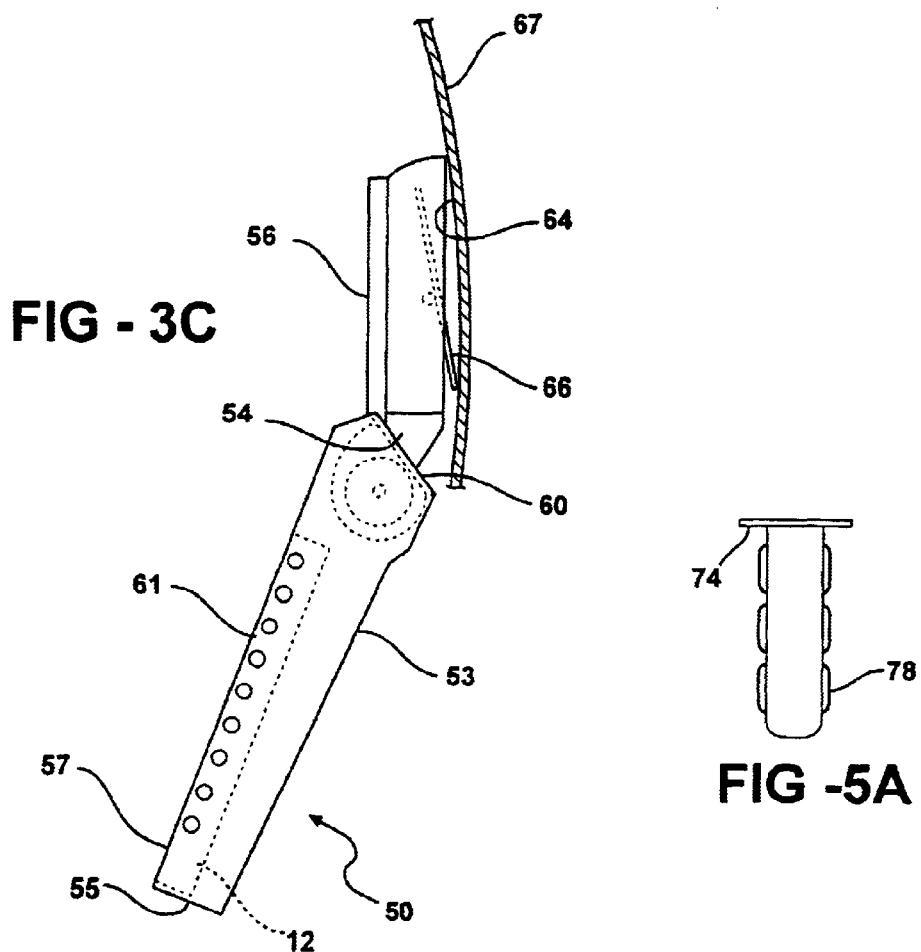
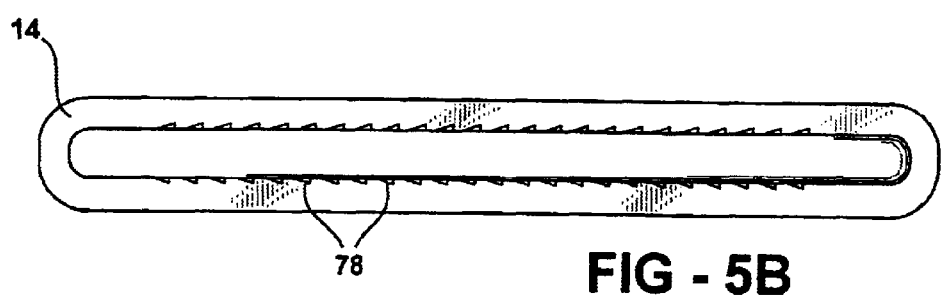
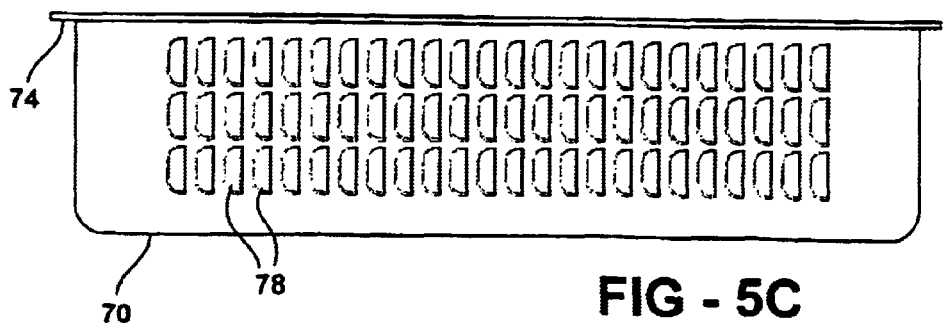

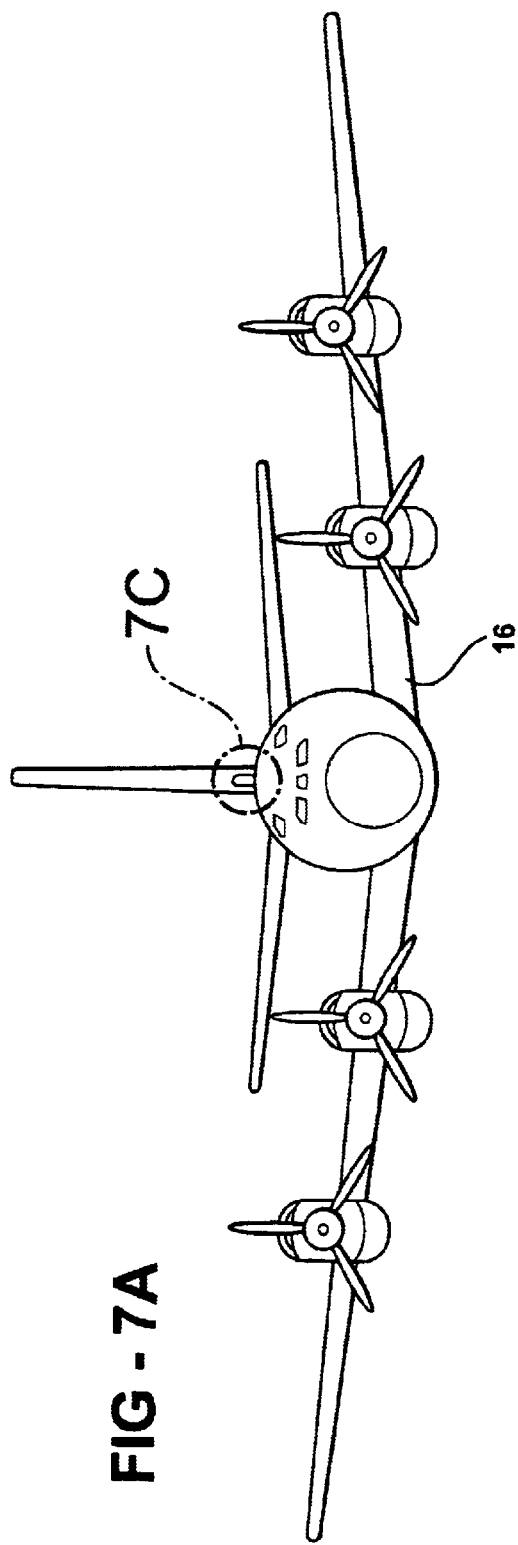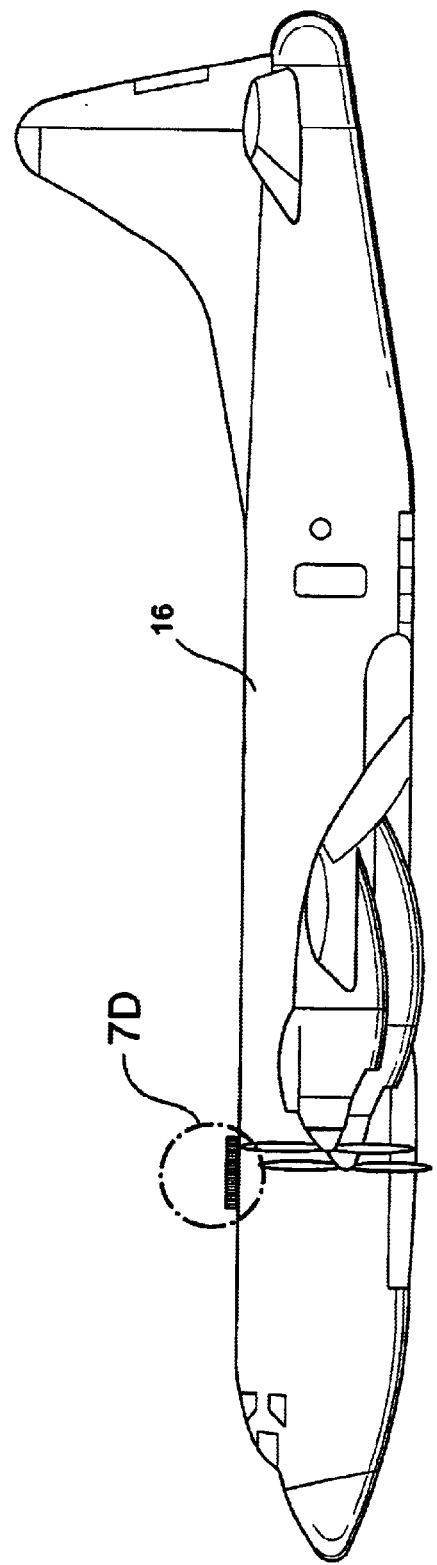
FIG - 7A
FIG - 7C
FIG - 7B
FIG - 7D

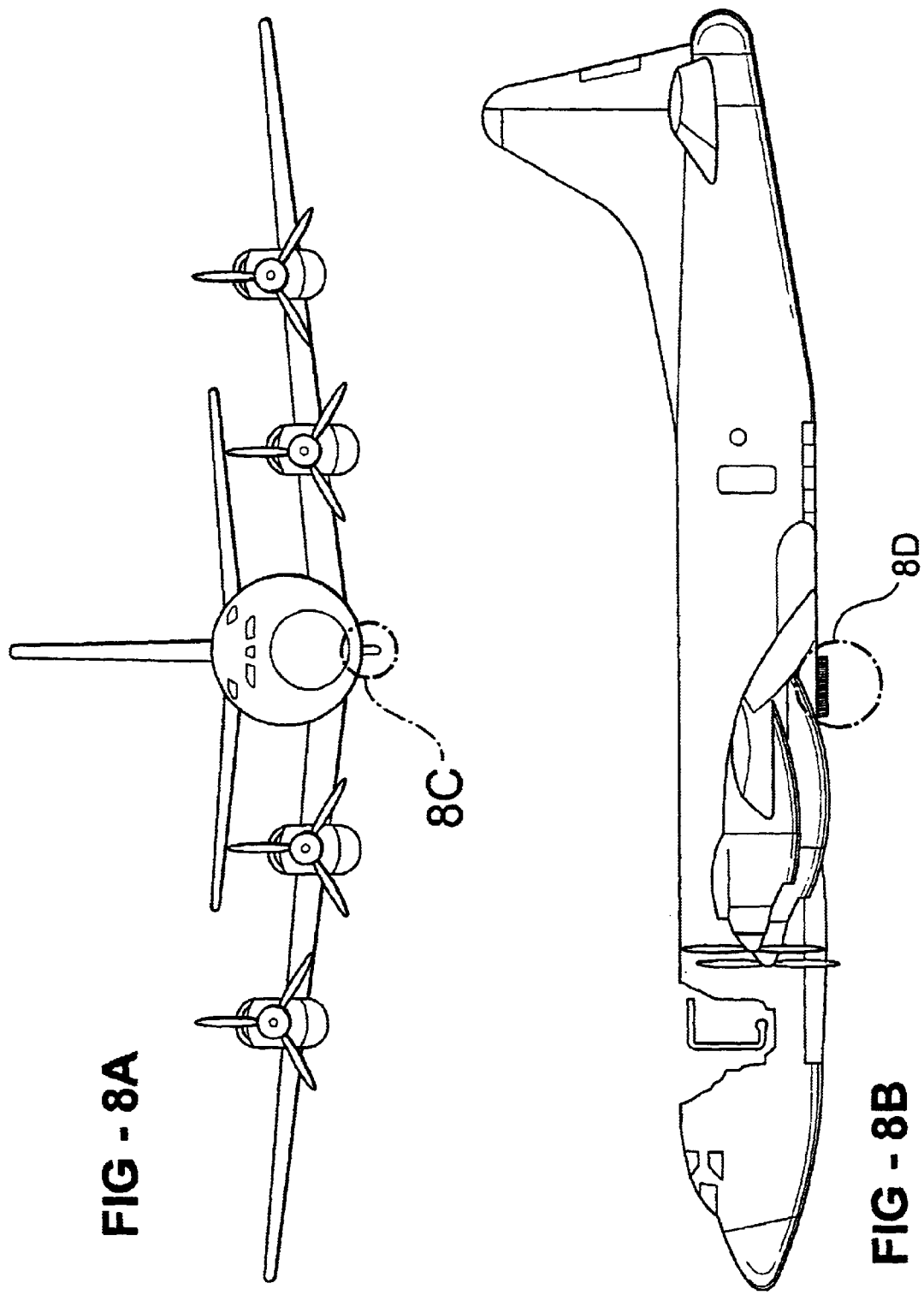

APPARATUS AND METHOD FOR MOUNTING A CONDENSER IN AN AIRCRAFT

This application claims the benefit under 35 U.S.C. §119(e) of provisional application No. 60/249,798 filed Nov. 17, 2000 and provisional application No. 60/336,526, filed Oct. 23, 2001.

FIELD OF THE INVENTION

The present invention relates to a cooling system for an aircraft, and more particularly, to a method and apparatus for mounting a condenser of a cooling system in an aircraft to permit overboard evacuation of residual heat created by the cooling system.

BACKGROUND OF THE INVENTION

Older cargo and commercial jetliners were not built with the sophisticated electronics and computer controls that are installed in today's modern aircraft. The controls that were utilized in such older aircraft were typically not affected by heat. Such controls may have comprised of the old vacuum tube variety. Because these older controls were not affected by overheating conditions, cooling systems were typically not designed or installed in such older aircraft.

Due to the high cost of modern aircraft, older aircraft are currently being retrofitted with newer electronics and computers. Such electronics include Inertial Navigation and Global Positioning Systems. These, as well as other electronics, are sensitive to elevated temperatures, and therefore, it is necessary to retrofit these older aircraft with cooling systems.

Such cooling systems utilize condensers which condense heated and compressed refrigerant gas of the cooling system into a liquid. To accomplish this result, the condenser provides a heat exchanger wherein the heated and compressed refrigerant gas is passed through a heat exchanger or radiator. The heat exchanger is subjected to cool air thereby condensing the gas inside the condenser to a liquid.

To cool the heat exchanger of the condenser, the condenser is subjected to relatively cool air. The cooler air is warmed by the heat exchanger of the condenser, and the warmed air is evacuated from the aircraft. To accomplish this with the condenser inside the aircraft, a pressurized compartment must be created to house the condenser so that air may pass from the outside to the inside of the aircraft without affecting the pressurization of the aircraft cabin. To build such a compartment would be an expensive and difficult task.

Thus, it would be desirable to provide a simple and cost-effective manner in which to provide ambient air to a condenser of a cooling system of an aircraft while providing overboard evacuation of the residual heat created by the condenser.

SUMMARY OF THE INVENTION

The present invention provides a method and apparatus for mounting a condenser of a cooling system in an aircraft to permit overboard evacuation of residual heat created by the cooling system of the aircraft. The invention provides an enclosure mountable to the aircraft wherein the enclosure provides an air inlet and an air outlet. The condenser of the cooling system is mounted within the enclosure and in communication with the air inlet and the air outlet of the enclosure. At least one powered impeller is mounted within the enclosure for directing air through the air inlet, across the condenser and out the air outlet.

In one embodiment, the enclosure is mounted on the outside of the aircraft. The impeller directs air from outside the aircraft through the air inlet, across the condenser, and through the air outlet to the exterior of the aircraft. In another embodiment, the enclosure is mounted within the aircraft. The impeller is mounted between the condenser and the air outlet to draw air through the air inlet, across the condenser, and out the air outlet to the exterior of the aircraft. Since the aircraft is not pressurized when the air outlet is open, this embodiment can only be utilized when the aircraft is not in flight.

BRIEF DESCRIPTION OF THE DRAWINGS

The description herein makes reference to the accompanying drawings wherein like reference numerals refer to like parts throughout several views and wherein:

FIG. 1 is a schematic showing the air conditioning system of the present invention.

FIGS. 2A–2B are front and side views of an embodiment of the present invention that is mounted outside the aircraft.

FIGS. 3A–3C are front, side and top views of the embodiment of the present invention mounted within the aircraft.

FIGS. 5A–5C are top, front and side views of the embodiment of the present invention shown in FIG. 4.

FIGS. 7A–7D are schematics showing the embodiment of the present invention in FIG. 4 mounted to the top of an aircraft.

FIGS. 8A–8D are schematics showing the embodiment of the present invention shown in FIG. 4 mounted to the underside of an aircraft.

DESCRIPTION OF THE PREFERRED EMBODIMENT

Figure 4:
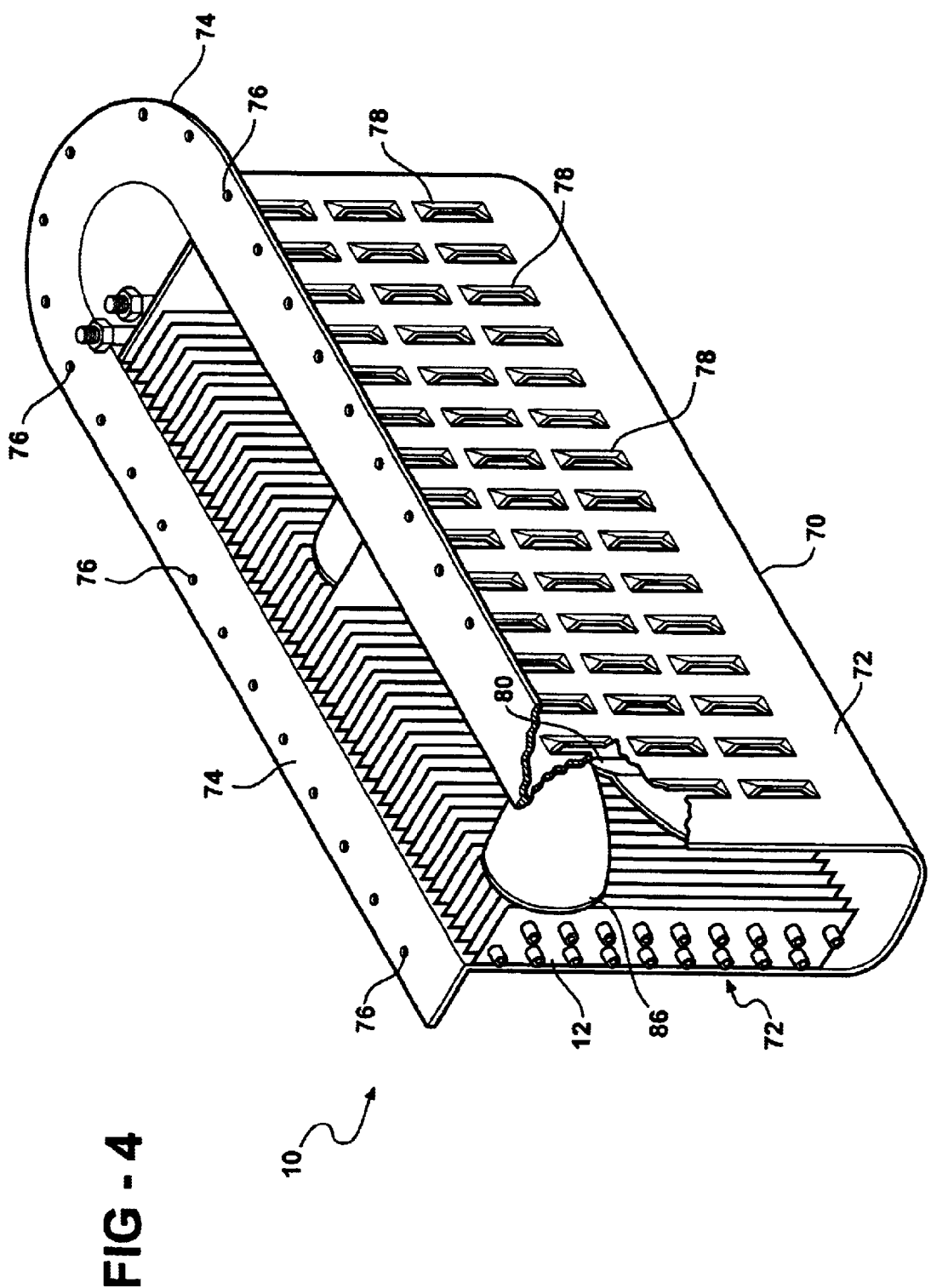
FIG. 4 is a perspective view of an additional embodiment of the present invention outside the aircraft.

Referring to the drawings, the present invention will now be described in detail with reference to the preferred embodiment.

FIGS. 1–8 illustrate the method and apparatus 10 of the present invention for mounting a condenser 12 of an air conditioning system 14 to an aircraft 16 to permit the overboard evacuation of residual heat created by the air conditioning system 14. As seen in FIG. 2, the condenser 12 of the air conditioning system 14 condenses a heated and compressed refrigerant gas to liquid. A receiver/dryer 18 stores the liquid refrigerant, removes moisture from the liquid refrigerant, and filters foreign particles from the liquid refrigerant as the refrigerant circulates within the air conditioning system 14. An expansion valve 20 sprays the liquid refrigerant and removes moisture and foreign particles from the refrigerant as the refrigerant circulates within the system 14. An evaporator 22 allows for the refrigerant to evaporate and cool air leading to the cabin of the aircraft 16. The refrigerant passes into a compressor 24 which compresses the low pressure refrigerant gas into a high pressure, high temperature gas. The refrigerant is directed back through the condenser 12 to complete the cycle.

In order for the condenser 12 to function properly, the condenser 12 must be subjected to cool air to cool and condense the heated and compressed refrigerant gas into liquid, and the air that is warmed by the condenser 12 must be allowed to escape to the outside of the aircraft 16. In the first embodiment, the present invention 10, as shown in FIG. 2, is mounted to the external surface of the aircraft 16. The first embodiment of the present invention 10 may be mounted to the nose wheel well, the aft wheel well compartment, or the under floor of the aircraft 16. However, the first embodiment of the present invention 10 is not limited to these mounting locations, but rather, the first embodiment of the present invention 10 may be mounted in any location on the aircraft 16 that provides sufficient air flow while not impeding the function of the aircraft 16.

The first embodiment of the present invention 10 provides an enclosure 26, having a trapezoidal configuration that is defined by a solid back wall 28, a top 30, a bottom 32, two sides 34, 36 and a front wall 38. The back wall 28 of the enclosure 26 is mounted directly to the aircraft 16 and may take on the corresponding shape of the aircraft 16. The top 30, bottom 32, and two sides 34, 36 of the enclosure 26 are connected to and extend outward substantially perpendicular from the back wall 28 of the enclosure 26. The two sides 34, 36 are substantially parallel with one another as are the top 30 and bottom 32 of the enclosure 26. The front wall 38 is connected to the top 30, bottom 32, and two sides 34, 36 and extends furthest from the external surface of the aircraft 16. The front wall 38 is generally acutely angled to the back wall 28 of the enclosure 26, however, this may vary depending on the shape of the aircraft 16 to which the back wall 28 of the enclosure 26 is mounted. The front wall 38 of the enclosure 26 provides a rectangular opening or air inlet 40 that extends along the length of the front wall 38. In addition, four smaller rectangular openings or air outlets 42 are provided in and spaced along the front wall 38 below the larger rectangular opening 40. The condenser 12 is mounted within the enclosure 26 and directly adjacent the large rectangular opening 40 in the front wall 38 of the enclosure 26. A louvered grill 41 may be placed across the rectangular opening 40 of the front wall 38 of the enclosure 26 to protect the condenser 12 from damage. Exposure of the condenser 12 to the non-pressurized, ambient air through the rectangular opening 40 and/or the louvers 41 of the front wall 38 of the enclosure 26 provides the necessary source of cool air to cool the condenser 12.

To pull the non-pressurized, ambient air through the condenser 12, a pair of powered impellers or blowers 44 are mounted within the enclosure 26. The blowers 44 each have a motor 46 for powering an impeller 45 disposed therein. The housings are mounted on the interior side of the front wall 38 of the enclosure 26 between the four rectangular openings 42. The rectangular openings are spaced in pairs such that a space for mounting the motors 46 of the blowers 44 is provided between each opening 42 of each pair. The blowers 44 also provide outlet ducts 48 that are in communication with the smaller rectangular openings 42 and inlet ducts which pull in condenser-warmed air from within the enclosure 26 and blow the condenser-warmed air through the outlet ducts 48 and out the smaller rectangular openings 42 to the outside of the aircraft 16.

In operation, the above-described embodiment of the present invention 10 mounts the enclosure 26 to the outside of the aircraft 16. Coolant lines (not shown) extend to and from the condenser 12 to communicate refrigerant to and from the condenser 12 to the cooling system. The coolant lines lead to and from the interior of the aircraft 16 in a sealed fashion. As the aircraft 10 travels, non-pressurized, ambient air passes across the enclosure 26 and is supplied to the condenser 12. The blowers 44 pull the ambient air through the air inlet 40 across the condenser 12 and into the enclosure 26 thereby cooling the condenser 12. The condenser-warmed air in the enclosure 26 is blown through the outlet ducts 48 of the blowers 44 and through the smaller rectangular openings or air outlets 42 of the front wall 38 of the enclosure 26 wherein the condenser-warmed air is evacuated from the aircraft 16.

In another embodiment, the apparatus of the present invention 10 is mounted within the aircraft 16, as seen in FIG. 3. This embodiment provides an enclosure 50 having a condenser box 52, a transition member 54 and a vent door cover 56. The condenser box 52 has a substantially trapezoidal configuration having a back wall 53, a bottom 55, two sides 57, 59, an end wall 60 and a front wall 61. The bottom 55, sides 57, 59 and end wall 60 extend between the back wall 53 and the front wall 61 to form an enclosure of the condenser box 52. A large substantially rectangular aperture or air inlet 63, similar to that provided in the previous embodiment, is provided in the front wall 61 of the condenser box 52. The condenser 12 is mounted within the condenser box 52 adjacent the large rectangular aperture 63. A louvered grill 57 may also be mounted across the rectangular aperture 63 in the condenser box 52 to protect the condenser 12 from potential damage.

To pull air through and across the condenser 12, as similarly provided in the previous embodiment, a single blower or powered impeller 44 is mounted within the condenser box 52. The condenser box 52 has a pair of substantially rectangular apertures 58 provided in the end wall 60 of the condenser box 52. The pair of rectangular apertures 58 are in communication with the transition member 54. The blower 44 houses a motor 62 and an impeller 69, wherein the motor 62 powers the impeller. The housing is mounted on a portion of the end wall 60 that separates the rectangular apertures 58 in the end wall 60 of the condenser box 52. A pair of outlet ducts 65 of the blower 44 extends from the motor 62 and communicates with the pair of apertures 58 provided in the end wall 60 of the condenser box 52. The blower 44 pulls in air through and across the condenser 12 and blows the condenser-warmed air through the outlet ducts 65 of the blower 44 and into the transition member 54.

In order to evacuate the condenser-warmed air from the aircraft 16, the transition member 54 is connected to and communicates with the outlet ducts 65 of the blower 44 and the vent door cover 56. The transition member 54 has a substantially triangular configuration wherein one side is connected to the end wall 60 of the condenser box 52 and another side is connected to the vent door cover 56. The triangular shape of the transition member 54 allows the condenser box 52 to hang and extend away from the interior of the fuselage 67 of the aircraft 16. The transition member 54 provides air ducts which communicate with the outlet ducts 65 of the blower 44 and air ducts of the vent door cover 56.

To direct the condenser-warmed air from the condenser 12 to the outside of the aircraft 16, the vent door cover 56 provides an enclosure that covers a vent 64 and a vent door 66 in the aircraft 16. The vent door cover 56 is mounted directly to the fuselage 67 of the aircraft 16 to enclose and cover the vent 64 and the vent door 66. The vent 64 may be a window opening of the aircraft 16 that was converted into the vent 64, or the vent 64 may take on some other structure that allows air to be directed there through. The air ducts of the vent door cover 56 lead directly to the opening in the vent 64 so that the condenser-warmed air is efficiently discharged from the aircraft 16.

In operation, the embodiment of the present invention 10 shown in FIG. 3 may only be utilized when the aircraft 16 is grounded. This is due to the fact that the vent door 66 must be open to utilize the present invention thereby preventing the aircraft 16 from being pressurized. When the aircraft 16 is in flight, the vent door 66 is closed over the vent 64 in a sealed fashion to maintain pressure within the aircraft 16. When in use, the blower 44 pulls air from inside the aircraft and across the condenser 12 to cool the refrigerant inside the condenser 12. The blower 44 directs the condenser-warmed air inside the condenser box 52 into the outlet ducts 48 of the blower 44 and into the air ducts 65 of the transition member 54. The condenser-warmed air passes through the transition member 54 and into the air ducts of the vent door cover 56 where the condenser-warmed air is directed through the vent 64 and outside the aircraft 16.

Figure 6:
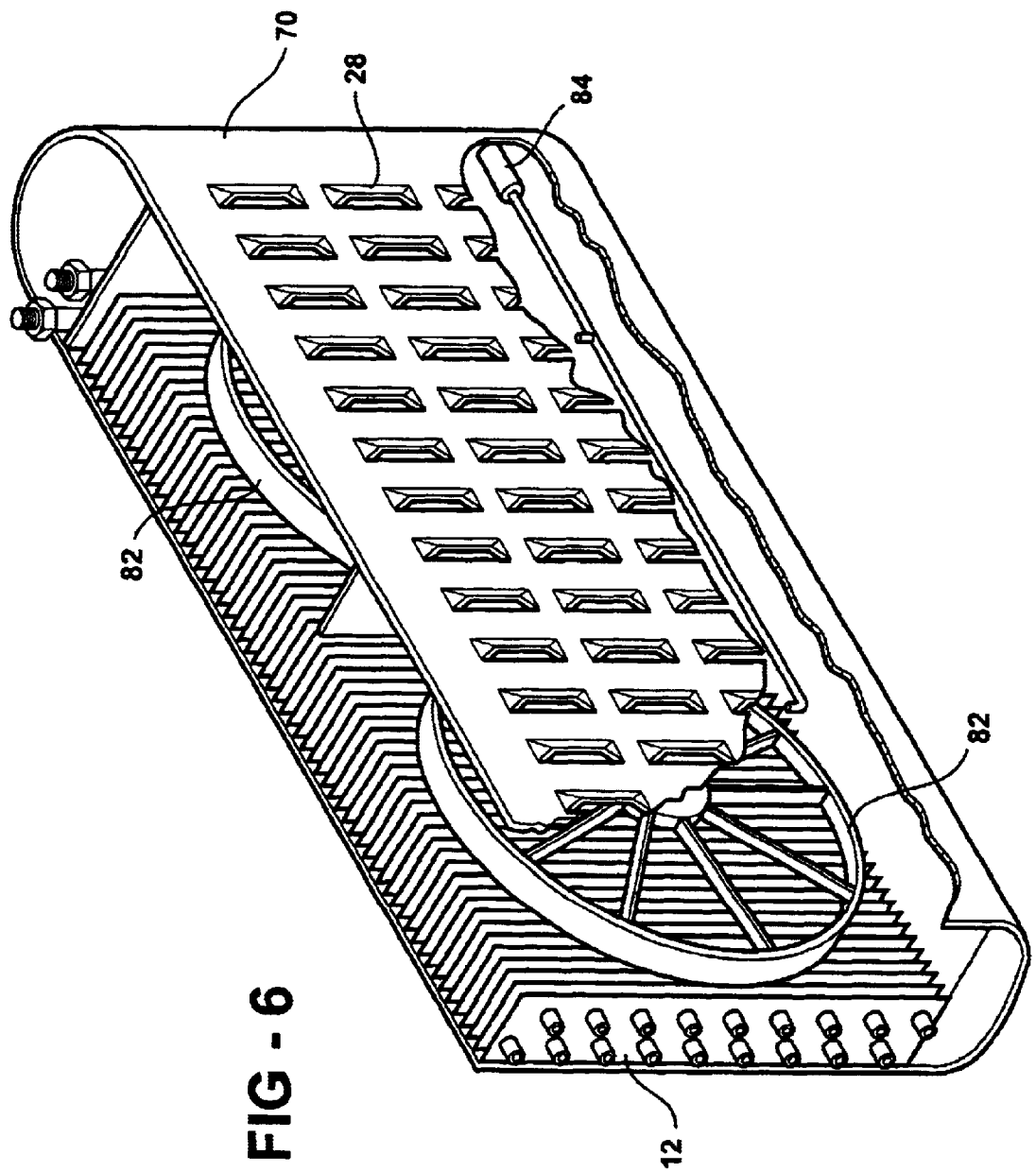
FIG. 6 is a perspective view with some portions broken away showing the locking valve for the embodiment of the present invention shown in FIG. 4.
Figure 7C:
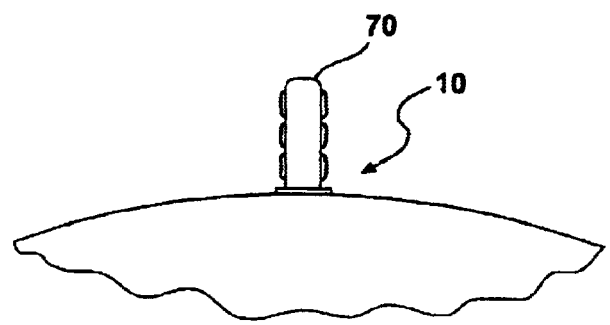
Figure 7D:
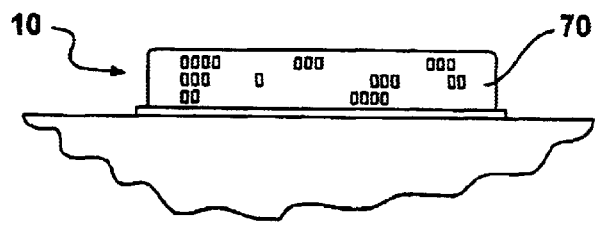
Figure 8C:
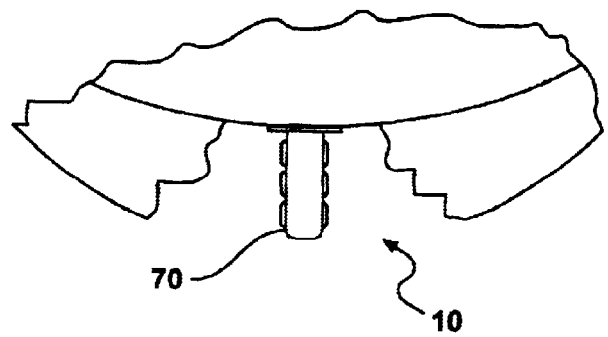
Figure 8D:
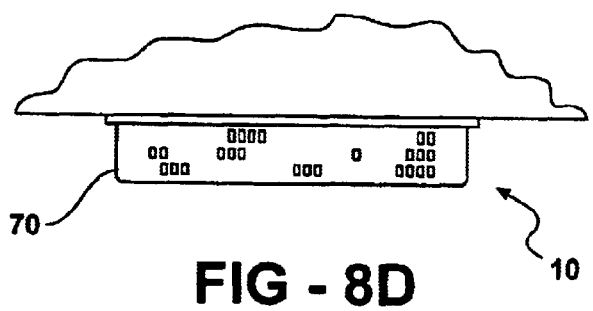

In yet another embodiment of the present invention 10, FIGS. 4–8 show the condenser 12 of the air conditioning system 14 mounted to the outside of the aircraft 16. The apparatus 10 may be mounted on the top of the aircraft 12, as shown in FIG. 7, or the apparatus 10 may be mounted underneath the aircraft 16, as shown in FIG. 8. However, the present invention 10 is not limited to these locations, but rather, the apparatus 10 may be located on any external surface of the aircraft 16.

To cool the condenser 12, non-pressurized, ambient air is provided to the condenser 12 by mounting the apparatus 10 to an external surface of the aircraft 16. An enclosure 70 is utilized to mount and secure the condenser 12 to the outside of the aircraft 16. The enclosure 70 has a slim, substantially rectangular aerodynamic design with outwardly extending walls 72 connected by rounded corners at its ends. A flange 74 extends from the bottom of the enclosure 70 wherein the flange 74 is substantially perpendicular to the walls 72 of the enclosure 70. The flange 74 provides a plurality of apertures 76 by which the enclosure 70 is connected to the aircraft 16 by fasteners (not shown). The walls 72 of the enclosure 70 provide a plurality of louvers 78 which open toward the rear of the aircraft 16. The louvers 78 allow for non-pressurized, ambient air to flow through the enclosures 70 to the condenser 12. The louvers 78 open toward the rear of the aircraft 16 so that the force of the air during the flight of the aircraft 16 does not pull the enclosure 70 away from the aircraft 16.

To keep the condenser 12 cool when the aircraft 16 is on the ground, the present invention 10 provides at least one powered impeller or electric fan 80 mounted within the enclosure 70 and adjacent the condenser 12. As seen in FIGS. 4 and 6, the embodiment provides for two fans 80, but the number of fans 80 is dependent on the size of the condenser 12. A larger condenser 12 will require more fans 80 to keep the condenser 12 cool. The electric fans 80 may be supported by their own framing structure 82 wherein the frame 82 is either mounted to the condenser 12 or the internal walls of the enclosure 70. When the aircraft 16 is on the ground, the electric fans 80 are actuated so as to blow air across the condenser 12 by pulling ambient air in from louvers 78 on one side of the enclosure 70 and out the louvers 78 on the opposite side of the enclosure 70.

In order to prevent the electric fans 80 from being damaged during the flight of the aircraft 16, the present invention provides a locking valve 84 that engages the blades 86 of the electric fans 80 to prevent the blades 86 from spinning while the aircraft 16 is in flight. When the aircraft 16 is on the ground, the valve 84 is deactuated, and the electric fans 80 are allowed to spin.

In operation, the present invention 10 is mounted either on the top of the aircraft 16 or on the bottom of the aircraft 16. When the aircraft 16 is on the ground, the electric fans 80 are actuated so as to cool the condenser 12 of the air conditioning system 14 of the aircraft 16. Once the aircraft 16 takes flight, the valve 84 actuates and locks the blades 86 of the electric fans 80 and prevents the blades 86 of the electric fans 80 from spinning. The cool ambient air that is provided in the upper elevations flows through the louvers 78 of the enclosure 70 so as to cool the condenser 12. Once the aircraft 16 lands back on the ground, the valve 84 is disengaged, and the electric fans 80 are actuated to cool the condenser 12.

While the invention has been described in connection with what is presently considered to be the most practical and preferred embodiment, it is to be understood that the invention is not to be limited to those disclosed embodiments, but, on the contrary, it is intended to cover various modifications and equivalent arrangements included within the spirit and scope of the appended claims which scope is to be accorded the broadest interpretation so as to encompass all such modifications and equivalent structures as is permitted under the law.

What is claimed is:

1. An apparatus for mounting a condenser of a cooling system to an aircraft, comprising:
    a generally rectangular, hollow enclosure having a bottom surface mountable to said aircraft, said enclosure having an air inlet and an air outlet wherein at least one of said air inlet and said air outlet are communicable within an ambient air source outside said aircraft;
    said condenser housed within said hollow enclosure and in communication with said air inlet and said air outlet; and
    at least one powered impeller housed within said enclosure for directing air through said air inlet, across said condenser and out said air outlet.

2. The apparatus as stated in claim 1, further comprising:
    said enclosure having a plurality of integral, stationary louvers adjacent at least one of said air inlet and said air outlet.

3. The apparatus as stated in claim 1, further comprising:
    said air being supplied by a non-pressurized, ambient air source.

4. The apparatus as state in claim 1, further comprising:
    said enclosure mountable to an external fuselage of said aircraft.

5. The apparatus stated in claim 1, further comprising:
    said enclosure mountable to an interior fuselage of said aircraft wherein said interior fuselage defines a vent to the exterior of said aircraft.

6. The apparatus stated in claim 1, further comprising:
    said at least one impeller mounted between said air inlet and said condenser for directing air from said air inlet, across said condenser, and through said air outlet for cooling said condenser when said aircraft is on the ground.

7. The apparatus stated in claim 6, further comprising:
    a valve for releasably locking said at least one impeller in a stationary position when said aircraft is in flight.

8. The apparatus stated in claim 1, further comprising:
    said at least one impeller mounted between said condenser and said air outlet for drawing air through said air inlet, across said condenser, and out said air outlet to cool said condenser.

9. An apparatus for mounting a condenser of a cooling system to an aircraft, comprising:
    an enclosure mountable to said aircraft, and said enclosure having an air inlet and an air outlet wherein at least one of said air inlet and said air outlet is communicable with a non-pressurized, ambient air source outside said aircraft;

said enclosure having a plurality of integral, stationary louvers adjacent at least one of said air inlet and said air outlet;

said condenser mounted within said enclosure between said air inlet and said air outlet; and at least one powered impeller mounted within said enclosure for pulling air into said air inlet, across said condenser, and out said air outlet to cool said condenser.

10. The apparatus stated in claim 9, further comprising:

said enclosure mountable to an external fuselage of said aircraft.

11. The apparatus stated in claim 9, further comprising:

said enclosure mountable to an interior fuselage of said aircraft wherein said interior fuselage defines a vent to the exterior of said aircraft.

12. The apparatus stated in claim 9, further comprising:

said at least one powered impeller mounted between said air inlet and said condenser for directing air from said air inlet, across said condenser, and through said outlet for cooling said condenser when said aircraft is on the ground.

13. The apparatus stated in claim 12, further comprising:

a valve for releasably locking said at least one impeller in a stationary position when said aircraft is in flight.

14. The apparatus stated in claim 9, further comprising:

said at least one powered impeller mounted within a blower wherein said blower is mounted within said enclosure between said condenser and said air outlet; and said blower having a motor mounted therein for powering said impeller, and said blower having an inlet duct for pulling in air from said air inlet of said enclosure, across said condenser and into said blower, and said blower having an outlet duct in communication with said air outlet of said enclosure for forcing the air from within said blower through said air outlet.

15. A method for mounting a condenser of a cooling system to an aircraft, comprising the steps of:

providing a generally rectangular, hollow enclosure with an air inlet and an air outlet wherein said enclosure has a bottom surface mountable to said aircraft;

communicating at least one of said air inlet and said air outlet with an ambient air source outside said aircraft;

housing said condenser within said hollow enclosure wherein said condenser is in communication with said air inlet and said air outlet; and directing non-pressurized, ambient air through said air inlet, across said condenser, and out through said air outlet.

16. The method stated in claim 15, further comprising the steps of:

providing integral, stationary louvers in said enclosure adjacent at least one of said air inlet and said air outlet.

17. The method stated in claim 15, further comprising the steps of:

mounting said enclosure to an external fuselage of said aircraft.

18. The method stated in claim 15, further comprising the steps of:

mounting said enclosure to an interior fuselage of said aircraft wherein said interior fuselage defines a vent to the exterior of said aircraft.

19. The method stated in claim 15, further comprising the steps of:

mounting said at least one powered impeller within said enclosure between said air inlet and said condenser for directing air from said air inlet, across said condenser, and through said air outlet for cooling said condenser when said aircraft is on the ground.

20. The method stated in claim 19, further comprising the steps of:

providing a locking valve for releasably locking said at least one impeller in a stationary position when said aircraft is in flight.

21. The method stated in claim 15, further comprising the steps of mounting said at least one powered impeller within said enclosure between said condenser and said air outlet for drawing air through said air inlet, across said condenser, and out said air outlet to cool said condenser.

* * * * *